United States Patent
Alrabady et al.

(10) Patent No.: US 8,527,015 B2
(45) Date of Patent: Sep. 3, 2013

(54) METHOD AND SYSTEM FOR FACILITATING COMMUNICATION OF INFORMATION TO A MOBILE PLATFORM

(75) Inventors: Ansaf I. Alrabady, Livonia, MI (US); Fred W. Huntzicker, Ann Arbor, MI (US); Michael Jay Abowd, Ann Arbor, MI (US); Karin L. Turski, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1068 days.

(21) Appl. No.: 11/678,079

(22) Filed: Feb. 23, 2007

(65) Prior Publication Data

US 2008/0208405 A1    Aug. 28, 2008

(51) Int. Cl.
*H04W 88/02* (2009.01)

(52) U.S. Cl.
USPC .......................................................... 455/574

(58) Field of Classification Search
USPC .......................................................... 455/574
See application file for complete search history.

(56) References Cited

U.S. PATENT DOCUMENTS

| | | |
|---|---|---|
| 5,717,387 A | 2/1998 | Suman et al. |
| 5,751,073 A | 5/1998 | Ross |
| 6,028,537 A | 2/2000 | Suman et al. |
| 6,031,465 A * | 2/2000 | Burgess ....................... 340/5.54 |
| 6,169,943 B1 * | 1/2001 | Simon et al. ................. 701/31.5 |
| 6,323,566 B1 * | 11/2001 | Meier ........................... 307/10.2 |
| 6,577,934 B2 | 6/2003 | Matsunaga et al. |
| 6,621,411 B2 | 9/2003 | McCarthy et al. |
| 6,687,587 B2 | 2/2004 | Kacel |
| 6,718,470 B1 | 4/2004 | Adams |
| 6,944,528 B2 | 9/2005 | Nagano |
| 7,010,402 B2 | 3/2006 | Flick |
| 7,031,717 B2 | 4/2006 | Mazzara |
| 7,068,153 B2 | 6/2006 | Flick |
| 7,091,822 B2 | 8/2006 | Flick et al. |
| 7,093,298 B2 | 8/2006 | Rodriquez et al. |
| 7,113,127 B1 | 9/2006 | Banet et al. |
| 7,119,709 B2 | 10/2006 | Magner et al. |
| 7,126,926 B1 | 10/2006 | Bjorklund et al. |
| 2001/0041551 A1 * | 11/2001 | Rotzoll ......................... 455/343 |
| 2002/0035429 A1 | 3/2002 | Banas |
| 2003/0120395 A1 | 6/2003 | Kacel |
| 2003/0147534 A1 | 8/2003 | Ablay et al. |
| 2004/0044454 A1 | 3/2004 | Ross et al. |
| 2007/0250220 A1 * | 10/2007 | Hunt et al. ........................ 701/1 |

FOREIGN PATENT DOCUMENTS

| | | |
|---|---|---|
| KR | 10-2004-0072744 A | 8/2004 |
| KR | 10-2007-0021220 A | 2/2007 |
| WO | 2006119976 A1 | 11/2006 |

* cited by examiner

*Primary Examiner* — Diane Mizrahi

(57) ABSTRACT

There is provided a method and system for facilitating communications between a remote access point and a mobile platform during a shutdown period. The mobile platform is equipped with a first receiver and a wireless communications receiver. A wake-up signal is wirelessly transmitted from a remote wireless device to the first receiver of the mobile platform. The communications receiver is activated based upon the wake-up signal. The remote access point is controlled to communicate with the communications receiver subsequent to the activation of the communications receiver.

18 Claims, 1 Drawing Sheet

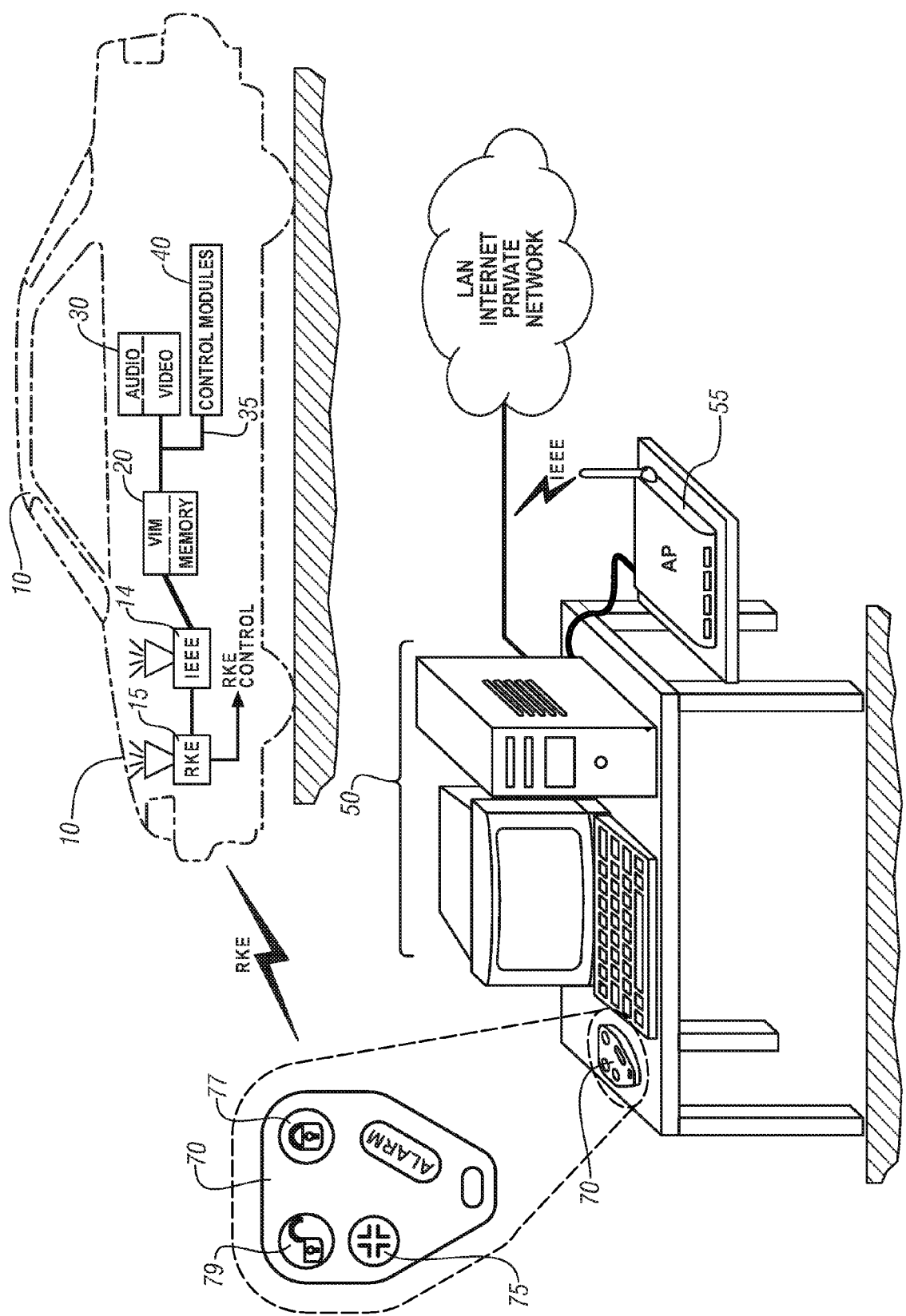

METHOD AND SYSTEM FOR FACILITATING COMMUNICATION OF INFORMATION TO A MOBILE PLATFORM

TECHNICAL FIELD

This invention pertains generally to mobile platforms and more specifically to wireless communications thereto.

BACKGROUND OF THE INVENTION

The statements in this section merely provide background information related to the present disclosure and may not constitute prior art.

There is a growing application of wireless communication services for mobile platforms, e.g., motor vehicles, to provide features related to navigation and audio/audio-visual media during operation of the mobile platform. Current communications systems typically comprise point-to-point communications, e.g., cellular systems, which typically operate at a low data bandwidth. Other systems comprise XM satellite radio systems, which use geostationary satellites to communicate music, news and audio entertainment to mobile platforms, typically operating at low data bandwidth, with a national distribution.

There may be a need to communicate information between the mobile platform and a stationary system during periods when the mobile platform is deactivated, such as when a vehicle is shutdown at a home base or in a personal garage, or at a commercial dispatch facility. Examples include downloading trip navigation information prior to an upcoming trip, transmitting formatted electronic data in the form of movies and/or music to the vehicle for passenger entertainment during a trip, and transmitting vehicle operating information comprising trip related data (e.g., operating time and miles traveled) and/or diagnostic trouble codes from the vehicle.

A wireless system operates most effectively when it is constantly activated. However, wireless communication consumes electrical energy and can drain a battery. Furthermore, there may be a plethora of remote wireless devices attempting to communicate with the wireless system of the mobile vehicle, requiring the wireless receiver to verify each remote device prior to permitting access to communicate therewith. Therefore, it is preferable to deactivate the wireless receiver when the mobile platform is shut off.

There is a need for a system and method which permits wireless communication to a mobile platform that is shutdown, which addresses the concerns described hereinabove.

SUMMARY OF THE INVENTION

In accordance with an embodiment of the invention, there is provided a method and system for facilitating communications between a remote access point and a mobile platform during a shutdown period. The mobile platform is equipped with a first receiver and a wireless communications receiver. A wake-up signal is wirelessly transmitted from a remote wireless device to the first receiver of the mobile platform. The communications receiver is activated based upon the wake-up signal. The remote access point is controlled to communicate with the communications receiver subsequent to the activation of the communications receiver.

These and other aspects of the invention will become apparent to those skilled in the art upon reading and understanding the following detailed description of the embodiments.

BRIEF DESCRIPTION OF THE DRAWING

The invention may take physical form in certain parts and arrangement of parts, the preferred embodiment of which will be described in detail and illustrated in the accompanying FIGURE which forms a part hereof, wherein:

the FIGURE is a schematic diagram, in accordance with the present invention.

DETAILED DESCRIPTION OF THE EMBODIMENTS

Referring now to the drawing, wherein the showings are for the purpose of illustrating the invention only and not for the purpose of limiting the same, the Figure depicts a mobile platform operative to communicate wirelessly with a remote system which has been constructed in accordance with an embodiment of the present invention. The mobile platform 10 comprises a motor vehicle, e.g., an automobile. A remote system 50 having a wireless access point ('AP') 55 is operative to communicate wirelessly with a communications receiver device 14 (hereinafter 'IEEE receiver') of the mobile platform 10 under predetermined conditions, to transmit formatted electronic data therebetween. There is a portable remote wireless device 70 that can be selectively manually activated by an operator (not shown). The remote wireless device 70 is operative to communicate a low power radio-frequency wake-up signal to a first communications receiver 15 (hereinafter 'RKE receiver') of the mobile platform 10 when a particular button is manually actuated by the operator. The wake-up signal causes the RKE receiver 15 to activate the IEEE receiver 14, permitting it to communicate wirelessly, typically for an elapsed period of time to preserve battery power. This is now described in detail.

The mobile platform 10 as depicted comprises a conventional passenger vehicle for use on public highways, and as shown is parked adjacent to a structure capable of housing the remote system, although the invention is not so limited. Specific elements of the vehicle comprise the RKE receiver 15 and the IEEE receiver 14, an on-board vehicle information management system 20 (VIM) including a memory storage manager and storage medium ('Memory'), one or more audio, video or other devices 30 which are selectively controlled and operated by occupants of the vehicle, and one or more control modules 40 for controlling various operations of the vehicle. The interface devices 30 and the control modules 40 communicate with the VIM 20 directly via a hardwire connection, or over a local area network 35 (LAN) using one or communications buses. The control modules 40 comprise general or special purpose electronic devices operative to control various aspects of vehicle operation, including, e.g., powertrain control, suspension and brake control, and, climate control.

The RKE receiver (shown as 'RKE') 15 preferably comprises a conventional wireless communications receiver that has been adapted to provide remote keyless entry (RKE) functionality to the mobile platform and having additional functionality as described. The RKE receiver is signally connected to the IEEE receiver 14 and the VIM 20 via a cable or other connection. The RKE receiver 15 is adapted to receive and authenticate wireless signals transmitted from the remote wireless device 70 even during periods when the mobile platform is shut down in a key-off mode, including the wake-up signal. The wireless signals transmitted to the RKE receiver from the remote wireless device 70 preferably comprise low power radio-frequency (RF) signals that have been encrypted. When the wake-up signal is transmitted to and authenticated by the RKE receiver 15 from the remote wireless device 70, the RKE receiver activates the IEEE receiver 14 and the VIM 20, enabling them to power up and communicate, preferably through the access point 55 of the remote system 50. Alternatively, the RKE receiver 15 may comprise another low power on-board wireless receiver, such as may be employed in a tire pressure monitoring system or other system.

The remote wireless device 70 preferably comprises a portable transponder or transceiver device operable by the vehicle operator that has been adapted to provide the added wake-up signal functionality. A particular example comprises a RKE key fob having a plurality of buttons which are depressible by the operator to command one or more of the following functions: lock and unlock vehicle entry doors; unlatch a vehicle trunk; open and close a sliding door or tailgate, and provide a vehicle alarm system by activating vehicle lights and horn. The remote wireless device 70 is preferably coded to wirelessly transmit a unique low power radio-frequency signal to the RKE receiver 12. Typically, remote wireless device 70 and RKE receiver 15 communicate at a wireless carrier frequency of 315 MHz utilizing amplitude shift keying (ASK) modulation. The preferred data stream is 64 to 128 bits long, including a preamble, a command code, and encryption code. The transmission rate is in the range of 2 to 20 kHz. Power consumption is preferably less than 1 mA, to preserve life of a battery in the device. In one embodiment, the remote wireless device 70 includes an additional button 75, depicted as "✢" in the Figure, which, when depressed as by an operator, generates and communicates the wake-up signal, suitably encrypted, to the RKE receiver 12. Alternatively, the remote wireless device 70 is equipped with conventional RKE buttons for commanding conventional actions including locking (depicted as 77), unlocking (depicted as 79), opening, closing, and unlatching (not shown). In the alternative, the remote wireless device 70 generates and communicates the wake-up signal to the RKE receiver 15 in response to the operator serially depressing a predetermined combination of the conventional RKE buttons, e.g., depressing the locking button multiple times in rapid succession when the vehicle is off.

The IEEE receiver 14 preferably comprises a known telematics unit and a signal demodulator operative to capture and interpret incoming signals, and communicate signals from the IEEE receiver 14 to the remote system 50. The incoming signals typically comprise formatted electronic data, as described hereinafter. A memory storage manager is signally connected thereto and employed to capture the incoming signals from the communication receiver in the VIM 20 after they have been decrypted and interpreted. The memory storage manager communicates the formatted electronic data to the interface devices 30 and control modules 40 at appropriate times. The IEEE receiver 14 and demodulator are operative to detect, decrypt, tune, and recover the information and data sent thereto. When the vehicle is shutdown, e.g., parked with ignition key-off, the IEEE receiver 14 and VIM 20 are shutdown, i.e., drawing minimal electrical current. When the IEEE receiver is shutdown, it has minimal functionality, primarily comprising an ability to respond to the activation signal transmitted from the RKE receiver 12. The IEEE receiver 14 and the VIM 20 activate for a period of time after the activation signal. The memory storage manager preferably is operably connected to embedded and removable storage devices to provide data storage in the VIM. The memory storage manager structures and provides data storage, and automatically refreshes storage content based on newly received content and/or file expiration period or date.

The memory storage manager retrieves files, and provides data storage for streaming applications to enable end-user features including fast-forward, stop/pause, and start of playback of video during normal operation of the system, i.e., when it is not shut down. The telematics unit is adapted to execute known communications protocols to provide two-way wireless communications with remote devices, including but not limited to the access point 55 of the remote system 50 and the remote wireless device 70. The communications protocols comprise any one of various known protocols, including, e.g., those compliant with the IEEE 802.11 Wireless Networking standard, typically operating at 2.4 GHz and capable of communicating 1 megabit per second (Mbit/sec) of information. The communication center 30 may further include a vehicle position unit, which maintains vehicle position information from an internal sensor or an external unit, i.e., a global positioning sensor (GPS) and system. It is understood that the vehicle may comprise, e.g., a privately owned passenger vehicle, a rental vehicle, a commercial vehicle, an over-the-road freight hauler, an agricultural vehicle, a construction vehicle, and, a boat.

In operation, when the vehicle is shutdown, the operator commands the remote wireless device 70 to generate and transmit the wake-up signal by depressing button 75, or by depressing a combination of the conventional RKE buttons of the remote wireless device 70. The wake-up signal is received and authenticated by the RKE receiver 15 when the remote wireless device 70 is in close proximity to the vehicle 10 and the vehicle is shutdown/key-off. When the RKE receiver 15 receives the low-power wake-up signal, it activates the IEEE receiver 14 and VIM 20 to communicate with and respond to an incoming wireless signal from the wireless access point ('AP') 55 signally connected to the remote system 50. Prior to activating the receiver and VIM for communications, the IEEE receiver 14 verifies and authenticates the communications request. This preferably includes verifying that the communications request is from the specific wireless access point 55.

When the IEEE receiver 14 is activated, the operator preferably commands the remote system 50 to communicate with the mobile platform by transmitting to and receiving data from the IEEE receiver 14 via wireless signals transmitted through the wireless access point 55.

Activating the WEE receiver 14 and VIM for communications with the wireless access point 55 of the remote system 50 results in the IEEE receiver and VIM being able to receive, interpret, store, and process the incoming formatted electronic data, and being able to transmit vehicle information to the remote system 50 in response to an inquiry therefrom via the incoming wireless signal. The proximity of the remote wireless device 70 to the vehicle when transmitting the low power wake-up signal is typically 20 to 50 meters.

The remote system 50 preferably comprises a conventional stand-alone computer equipped with and adapted to communicate with the vehicle 10 via a signal router device and the wireless access point 55. The wireless access point 55 may be connected to other computer devices via a local area network, and may also be connected to a private network or the public Internet.

In operation, the system operates to facilitate communications between the remote system 50 and the mobile platform 10 when the mobile platform is shutdown. Examples of this scenario include, e.g., a personal vehicle parked outside of the owner's dwelling place, and a vehicle parked at a place of business adjacent to a dispatcher's office. When the vehicle is parked and shutdown, the IEEE receiver 14, VIM 20, and other electronic systems of the vehicle are preferably shutdown and turned off to preserve electrical energy in the vehicle battery and prevent battery drain. During the shutdown period, when the operator depresses button 75, the wake-up signal is sent, and is read and interpreted by the RKE receiver 15 when the remote wireless device 70 is within range of the vehicle 10, as previously described.

The formatted electronic data transmitted between the mobile platform and the wireless access point enable features, applications and services including, e.g., navigation information, travel information, entertainment information and files such as music, image and video files. Furthermore, vehicle performance enhancements and fixes can be communicated and enabled including remote re-programming of one or more of the control modules 40. Vehicle information can be transmitted to the remote system 50, including vehicle operation data, and diagnostic trouble codes, facilitating management of maintenance schedules (e.g., oil changes) and scheduling of repairs.

The invention has been described with specific reference to the embodiment and modifications thereto. Further modifications and alterations may occur to others upon reading and understanding the specification. It is intended to include all such modifications and alterations insofar as they come within the scope of the invention.

Having thus described the invention, it is claimed:

1. Method for facilitating communications between a remote access point and a mobile platform equipped with a first receiver and a two-way wireless communications receiver during a shutdown period, comprising:
    wirelessly transmitting a wake-up signal from a first remote wireless device to the first receiver of the mobile platform, the first remote wireless device comprising a portable transponder device;
    authenticating a communication request signal transmitted from a second remote wireless device to the two-way wireless communications receiver, the second remote wireless device comprising the remote access point of a stand-alone computer;
    controlling the first receiver to activate the two-way wireless communications receiver and an information management system based upon the wake-up signal and the authenticating the communication request signal from the second remote wireless device, the information management system signally connected to the two-way wireless communications receiver and in direct communication with at least one interface device of the mobile platform;
    controlling the remote access point to communicate with the two-way wireless communications receiver subsequent to the activation of the two-way wireless communications receiver and the information management system and subsequent to the authentication of the communication request signal transmitted from the second remote wireless device to the two-way wireless communications receiver; and
    communicating information between the information management system and the second remote wireless device through the two-way wireless communications receiver, wherein communicating information comprises enabling features of entertainment information of the at least one interface device of the mobile platform.

2. The method of claim 1, wherein wirelessly transmitting the wake-up signal from the first remote wireless device to the first receiver of the mobile platform comprises selectively activating a radio-frequency signal generator resident in the first remote wireless device operative to generate and transmit a low-power signal interpretable by the first receiver.

3. The method of claim 2, wherein selectively activating the signal generator comprises pressing a wireless enable button on the first remote wireless device proximal to the mobile platform.

4. The method of claim 3, further comprising: authenticating the wake-up signal transmitted from the first remote wireless device as a condition-precedent to activating the two-way wireless communications receiver.

5. The method of claim 1, further comprising: de-activating the two-way wireless communications receiver when there has been no authenticated communication request signal transmitted between the two-way wireless communications receiver and the second remote wireless device comprising the remote access point for a predetermined elapsed period of time.

6. The method of claim 1, wherein controlling the second remote wireless device comprising the remote access point to communicate with the two-way wireless communications receiver subsequent to the activation of the two-way wireless communications receiver comprises transmitting formatted electronic data therebetween.

7. The method of claim 1, wherein the remote wireless device transmits the wake-up signal subsequent to depressing a predetermined combination of buttons.

8. A mobile platform adapted to selectively communicate with a remote system via a remote access point during a period when the mobile platform is shutdown, comprising:
    a first communications receiver, adapted to receive a wake-up signal transmitted from a portable remote wireless device comprising a portable transponder device, and signally connected to and selectively operative to activate a two-way wireless communications receiver in response to the wake-up signal transmitted from the portable remote wireless device when the mobile platform is shutdown and subsequent to authenticating a communication request signal transmitted from the remote access point comprising a stand-alone computer to the two-way wireless communications receiver;
    the two-way wireless communications receiver, signally connected to an on-board information management system, the information management system in direct communication with at least one interface device of the mobile platform; and
    the two-way wireless communications receiver operative to activate the information management system and operative to communicate with the remote access point subsequent to authenticating the communication request signal therebetween and subsequent to activating the two-way wireless communications receiver to transmit formatted electronic data therebetween, the two-way wireless communications receiver further operative to communicate information between the information management system and the remote access point of the stand-alone computer subsequent to the activation, wherein communicating information comprises enabling features of entertainment information of the at least one interface device of the mobile platform.

9. The mobile platform of claim 8, further comprising the two-way wireless communications receiver being deactivated when there has been no authenticated communication request signal transmitted between the wireless communications receiver and the remote access point for a predetermined elapsed period of time.

10. The mobile platform of claim 8, wherein the first communications receiver is operative to authenticate the wake-up signal transmitted from the portable remote wireless device prior to activating the two-way wireless communications receiver.

11. The mobile platform of claim 10, wherein the first communications receiver comprises a remote keyless entry system adapted for the mobile platform.

12. The mobile platform of claim 11, wherein the wake-up signal comprises a low power radio-frequency signal originating from and selectively generated by a remote transponder operative to communicate with the remote keyless entry system in response to an operator depressing a button thereon.

13. The mobile platform of claim 8, wherein the wake-up signal comprises a wireless signal originating from and selectively generated by a remote transponder operative to communicate with the first communications receiver in response to an operator depressing a button thereon.

14. The mobile platform of claim 8, wherein the two-way wireless communications receiver discontinues wireless communications and deactivates subsequent to a shutdown of the mobile platform.

15. The mobile platform of claim 14, wherein the shutdown comprises a key-off event of the mobile platform.

16. The mobile platform of claim 8, wherein the two-way wireless communications receiver comprises a device adapted to communicate using a communications protocol compliant with IEEE 802.11.

17. The mobile platform of claim 8, wherein the remote wireless device transmits the wake-up signal subsequent to depressing a predetermined combination of buttons.

18. Method for communicating formatted electronic data between a remote access point and a mobile platform equipped with a first communications receiver and a two-way wireless communications receiver, comprising:

wirelessly transmitting a wake-up signal transmitted subsequent to depressing a predetermined combination of buttons comprising an encrypted radio-frequency signal from a portable remote wireless device comprising a portable transponder device proximal to the first communications receiver of the mobile platform during a shutdown period;

authenticating a communication request signal transmitted from a second remote wireless device to the two-way wireless communications receiver, the second remote wireless device comprising the remote access point of a stand-alone computer;

controlling the first receiver to activate the two-way wireless communications receiver and an information management system based upon the wake-up signal and the authenticating the communication request signal from the second remote wireless device, the two-way wireless communications receiver signally connected to an information management system in direct communication with at least one interface device of the mobile platform;

controlling the two-way wireless communications receiver to communicate the formatted electronic data with the remote access point using a communications protocol compliant with IEEE 802.11 subsequent to the activation of the two-way wireless communications receiver and the information management system and subsequent to authenticating the communication request signal transmitted from the remote access point to the two-way wireless communications receiver; and communicating information between the information management system and the second remote wireless device through the two-way wireless communications receiver, wherein communicating information comprises enabling features of entertainment information of the at least one interface device of the mobile platform.

* * * * *